US012480812B2

(12) United States Patent
Yang et al.

(10) Patent No.: US 12,480,812 B2
(45) Date of Patent: Nov. 25, 2025

(54) METASURFACE-BASED SPECTROMETER AND ELECTRONIC DEVICE

(71) Applicant: Shphotonics Ltd, Suzhou (CN)

(72) Inventors: Xinzheng Yang, Suzhou (CN); Lei Sun, Suzhou (CN); Bing Qiu, Suzhou (CN)

(73) Assignee: SHPHOTONICS LTD, Suzhou (CN)

( * ) Notice: Subject to any disclaimer, the term of this patent is extended or adjusted under 35 U.S.C. 154(b) by 342 days.

(21) Appl. No.: 18/192,872

(22) Filed: Mar. 30, 2023

(65) Prior Publication Data
US 2023/0314218 A1    Oct. 5, 2023

(30) Foreign Application Priority Data

Apr. 1, 2022    (CN) .......................... 202210347613.7

(51) Int. Cl.
*G01J 3/28*    (2006.01)
*G01J 3/18*    (2006.01)

(52) U.S. Cl.
CPC .. *G01J 3/28* (2013.01); *G01J 3/18* (2013.01)

(58) Field of Classification Search
CPC .... G01J 3/28; G01J 3/18; G01J 3/2803; G01J 3/0256; G01J 3/0208; G01J 3/36; G01J 3/0205; G01J 3/02; G01J 3/2846; G02B 1/002; G02B 5/1809; G02B 5/1819; G02B 5/1861

See application file for complete search history.

(56) References Cited

U.S. PATENT DOCUMENTS

| | | | | |
|---|---|---|---|---|
| 4,729,658 | A * | 3/1988 | Poultney | G01J 3/18 356/334 |
| 6,943,950 | B2 * | 9/2005 | Lee | G02B 5/1828 359/290 |
| 2007/0030484 | A1 * | 2/2007 | Sobczynski | G01J 3/18 356/328 |
| 2019/0178714 | A1 * | 6/2019 | Faraji-Dana | G02B 5/1847 |
| 2021/0003446 | A1 * | 1/2021 | Wang | G01J 3/18 |
| 2022/0373819 | A1 * | 11/2022 | Osmanis | G02B 30/52 |

* cited by examiner

*Primary Examiner* — Abdullahi Nur
(74) *Attorney, Agent, or Firm* — ANOVA LAW GROUP, PLLC

(57) ABSTRACT

A spectrometer includes a collimator, a grating array, a metasurface, and a photodetector. The collimator is configured to collimate light including a plurality of portions with different wavelengths. The grating array is configured to guide, disperse, and deflect the light from the collimator. The metasurface array is configured to guide and focus the light from the grating array. The plurality of portions of the light with different wavelengths are focused by the metasurface array to different positions on a detection plane. The photodetector is configured to receive the light from the metasurface array at the detection plane.

16 Claims, 13 Drawing Sheets

METASURFACE-BASED SPECTROMETER AND ELECTRONIC DEVICE

CROSS-REFERENCE TO RELATED APPLICATION

This application claims priority to Chinese Application No. 202210347613.7, filed on Apr. 1, 2022, the entire content of which is incorporated herein by reference.

TECHNICAL FIELD

The present disclosure relates to the metasurface technology field and, in particular, to a spectrometer and an electronic device.

BACKGROUND

Metasurface refers to a device formed by arranging artificial two-dimensional structures at sub-wavelengths. In an optical wavelength band, a basic structural unit of metasurface is a nano-structural unit with a size smaller than the working wavelengths. Metasurface can realize flexible and effective control of the characteristics, such as polarization, amplitude, phase, and propagation mode, of electromagnetic waves.

Metasurface is ultra-light and ultra-thin. Compared with conventional optical devices, a metasurface optical device fabricated based on metasurface has advantages of excellent optical performance, small size, and high integration. Metasurface optical devices can be widely used in future portable and miniaturized devices, such as augmented reality wearable devices, virtual reality wearable devices, and mobile terminal lenses.

SUMMARY

Embodiments of the present disclosure provide a spectrometer, including a collimator, a grating array, a metasurface, and a photodetector. The collimator is configured to collimate light including a plurality of portions with different wavelengths. The grating array is configured to guide, disperse, and deflect the light from the collimator. The grating array can be meta-grating array having a metasurface or a normal grating array without a metasurface. The metasurface array is configured to guide and focus the light from the grating array. The plurality of portions of the light with different wavelengths are focused by the metasurface array to different positions on a detection plane. The meta-grating array and the metasurface for focusing can be integrated into one metasurface with proper phase profile design. The photodetector is configured to receive the light from the metasurface array at the detection plane.

Embodiments of the present disclosure provide an electronic device, including a spectrometer. The spectrometer includes a collimator, a grating array, a metasurface, and a photodetector. The collimator is configured to collimate light including a plurality of portions with different wavelengths. The grating array is configured to guide, disperse, and deflect the light from the collimator. The metasurface array is configured to guide and focus the light from the grating array. The plurality of portions of the light with different wavelengths are focused by the metasurface array to different positions on a detection plane. The photodetector is configured to receive the light from the metasurface array at the detection plane.

DETAILED DESCRIPTION OF THE EMBODIMENTS

Figure 1:
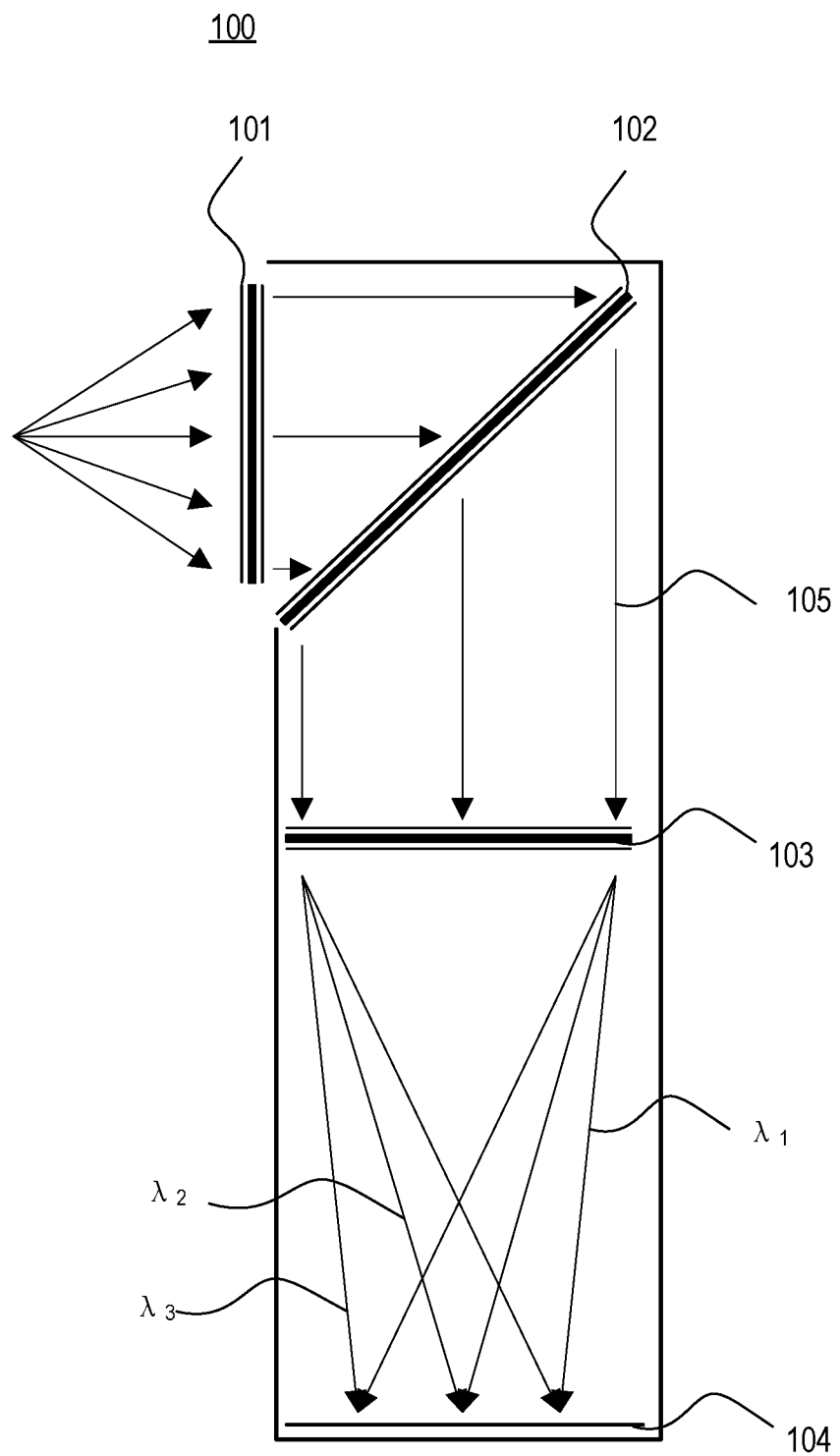
FIG. 1 is a schematic cross-section diagram of a spectrometer according to some embodiments of the present disclosure.

In the following, some example embodiments are described. As those skilled in the art would recognize, the described embodiments can be modified in various manners, all without departing from the spirit or scope of the present disclosure. Accordingly, the drawings and descriptions are illustrative in nature and not limiting.

In the present disclosure, terms such as "first," "second," and "third" can be used to describe various elements, components, regions, layers, and/or parts. However, these elements, components, regions, layers, and/or parts should not be limited by these terms. These terms are only used to distinguish one element, component, region, layer, or part from another element, component, region, layer, or layer. Therefore, a first element, component, region, layer, or part discussed below can also be referred to as a second element, component, region, layer, or part, which does not constitute a departure from the teachings of the present disclosure.

A term specifying a relative spatial relationship, such as "below," "beneath," "lower," "under," "above," or "higher," can be used in the disclosure to describe the relationship of one or more elements or features relative to other one or more elements or features as illustrated in the drawings. These relative spatial terms are intended to also encompass different orientations of the device in use or operation in addition to the orientation shown in the drawings. For example, if the device in a drawing is turned over, an element described as "beneath," "below," or "under" another element or feature would then be "above" the other element or feature. Therefore, an example term such as "beneath" or "under" can encompass both above and below. Further, a term such as "before," "in front of," "after," or "subsequently" can similarly be used, for example, to indicate the order in which light passes through the elements. A device can be oriented otherwise (e.g., being rotated by 90 degrees or being at another orientation) while the relative spatial terms used herein still apply. In addition, when a layer is referred to as being "between" two layers, it can be the only layer between the two layers, or there can be one or more intervening layers. In this disclosure, if a light beam encounters a first element and then reaches a second element, the second element is referred to as being downstream the first element or downstream the first element in an optical path, and correspondingly the first element is referred to as being upstream the second element or upstream the second element in the optical path.

Terminology used in the disclosure is for the purpose of describing the embodiments only and is not intended to limit the present disclosure. As used herein, the terms "a," "an," and "the" in the singular form are intended to also include the plural form, unless the context clearly indicates otherwise. Terms such as "comprising" and/or "including" specify the presence of stated features, entities, steps, operations, elements, and/or parts, but do not exclude the existence or addition of one or more other features, integers, steps, operations, elements, parts, and/or combinations thereof. As used herein, the term "and/or" includes any and all combinations of one or more of the listed items. The phrases "at least one of A and B" and "at least one of A or B" mean only A, only B, or both A and B.

When an element or layer is referred to as being "on," "connected to," "coupled to," or "adjacent to" another element or layer, the element or layer can be directly on, directly connected to, directly coupled to, or directly adjacent to the other element or layer, or there can be one or more intervening elements or layers. In contrast, when an element or layer is referred to as being "directly on," "directly connected to," "directly coupled to," or "directly adjacent to" another element or layer, then there is no intervening element or layer. "On" or "directly on" should not be interpreted as requiring that one layer completely covers the underlying layer.

In the disclosure, description is made with reference to schematic illustrations of example embodiments (and intermediate structures). As such, changes of the illustrated shapes, for example, as a result of manufacturing techniques and/or tolerances, can be expected. Thus, embodiments of the present disclosure should not be interpreted as being limited to the specific shapes of regions illustrated in the drawings, but are to include deviations in shapes that result, for example, from manufacturing. Therefore, the regions illustrated in the drawings are schematic and their shapes are not intended to illustrate the actual shapes of the regions of the device and are not intended to limit the scope of the present disclosure.

Unless otherwise defined, all terms (including technical and scientific terms) used herein have the same meaning as commonly understood by those of ordinary skill in the art to which this disclosure belongs. Terms such as those defined in commonly used dictionaries should be interpreted to have meanings consistent with their meanings in the relevant field and/or in the context of this disclosure, unless expressly defined otherwise herein.

As used herein, the term "substrate" can refer to the substrate of a diced wafer, or the substrate of an un-diced wafer. Similarly, the terms "chip" and "die" can be used interchangeably, unless such interchange would cause conflict. The term "layer" can include a thin film, and should not be interpreted to indicate a vertical or horizontal thickness, unless otherwise specified.

FIG. 1 is a schematic cross-section diagram of a spectrometer 100 according to some embodiments of the present disclosure. As shown in FIG. 1, the spectrometer 100 includes a collimator 101, at least one grating array 102, at least one metasurface array 103, and at least one photodetector 104.

The collimator 101 can be configured to collimate light emitted from a slit. In the example shown in FIG. 1, the collimator 101 receives the light emitted from the slit. Each beam of the light can have a different propagation direction. The collimator 101 can change a direction of incident light to cause propagation directions of beams of the light to be parallel to each other after passing through the collimator 101.

The at least one grating array 102 can be configured to guide and disperse the light from the collimator 101. Although only one grating array 102 is shown in FIG. 1, the spectrometer 100 can include more grating arrays 102 in some other embodiments. The grating arrays can be optically cascaded with each other, and light incident to each grating array can be deflected by the grating array.

After receiving the parallel light from the collimator 101, the at least one grating array 102 can divide the parallel light based on wavelengths of different kinds of light. In FIG. 1, the grating array 102 includes a meta-grating array or a general grating array. The grating array 102 can be configured to disperse a plurality of kinds of monochromatic light that form a broad spectrum. A dispersion angle can be related to a wavelength of each kind of monochromatic light. FIG. 1 only shows a scene in which center wavelength light 105 is dispersed by the grating array 102. However, the grating array 102 can be configured to disperse light of different wavelengths in different dispersion angles to divide the light.

The at least one metasurface array 103 can be configured to guide and focus light from the at least one grating array 102. Although only one metasurface array 103 is shown in FIG. 1, in some other embodiments, the spectrometer 100 can include more metasurface arrays 103, which are optically cascaded with each other. Portions of the light of different wavelengths incident on the at least metasurface array 103 can be focused to different positions of a detection plane by the at least metasurface array 103.

The at least one photodetector 104 can be configured to receive the light from the at least one metasurface array 103 on the detection plane. In some embodiments, the at least one photodetector 104 can include a CMOS sensor. The CMOS sensor can be configured to detect intensities of light at different positions of the detection plane and convert the intensities into electrical signals to obtain a spectrum. In some other embodiments, the photodetector 104 can include another type of photodetection element, which is not limited in the present disclosure.

According to embodiments of the disclosure, a wavelength range of spectrum detection can be greatly enlarged by using the array grating and the array meta-lens for different wavelength bands. In addition, by replacing a curved lens in a conventional spectrometer using meta-lens, the structure of the spectrometer can be greatly simplified, and the size of the spectrometer can be reduced. By using the meta-lens, the size of the lens can be increased to a certain degree without increasing the size of the spectrometer. Since a resolution of the focused lens is proportional to a numerical aperture, the numerical aperture of the meta-lens can be enlarged by enlarging the size of the meta-lens to improve the resolution of the spectrometer.

According to some embodiments, each grating array of the at least one grating array can include N gratings arranged along a corresponding plane. Each grating can be configured to selectively guide and disperse light in a corresponding wavelength range. N can be an integer greater than or equal to 1.

Figure 2:
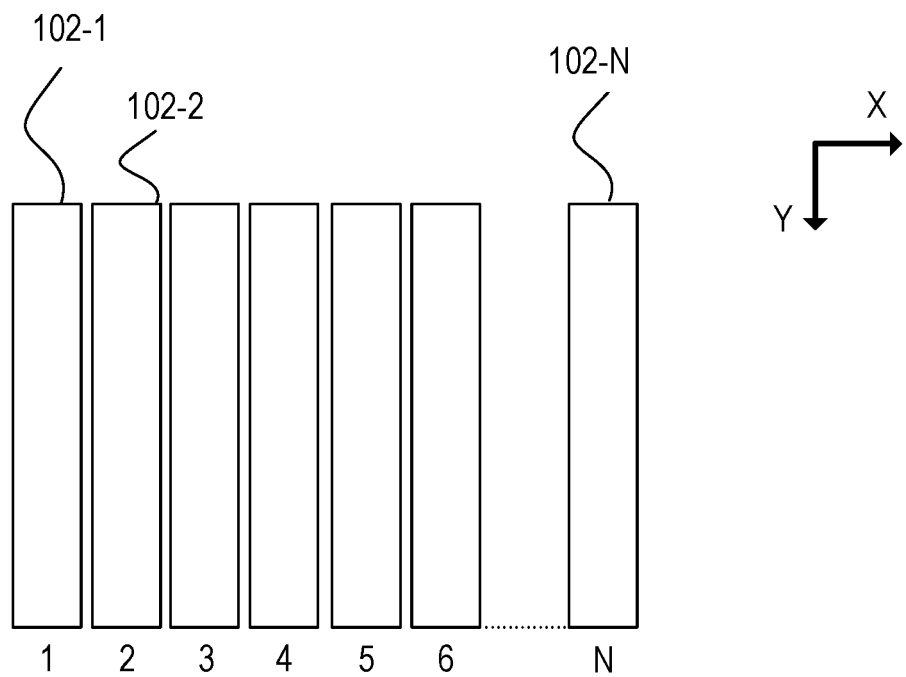
FIG. 2 is a schematic top view showing a grating array in the spectrometer of FIG. 1 according to some embodiments of the present disclosure.

FIG. 2 is a schematic top view showing the grating array 102 in the spectrometer 100 of FIG. 1 according to some embodiments of the present disclosure. As shown in FIG. 2, the grating array 102 includes N gratings 102-1 to 102-N.

In some embodiments, a designed wavelength range of the spectrometer 100 can be 400 to 1000 nm. The wavelength range can be divided into 6 bands (i.e., N=6). Each wavelength band can cover a wavelength range of 100 nm. The grating 102-1 can be for light with a wavelength of 400 to 500 nm, the grating 102-2 can be for light with a wavelength of 500 to 600 nm, and so on. The grating 102-N can be for light with a wavelength of 900 to 1000 nm. The above wavelength ranges and value of N can be exemplary, which are not limited in the present disclosure.

According to some embodiments, in each grating array, the N gratings can be arranged side by side along a first direction. The first direction can be parallel to a direction along which the slit extends. For example, in FIG. 2, the gratings 102-1 to 102-N are arranged side-by-side along a direction of the X-axis, and a length direction of each grating extends along a direction of the Y-axis.

In some embodiments, the wavelength bands of the N gratings can be continuous. For example, the grating 102-1 can be configured to guide and disperse the light with a wavelength of 400 to 500 nm. The grating 102-2 can be configured to guide and disperse the light with a wavelength of 500 to 600 nm, and so on. The grating 102-N can be configured to guide and disperse the light with a wavelength of 900 to 1000 nm. In some embodiments, the wavelength bands of the N gratings can be non-continuous or non-sequential. For example, the wavelength bands of the N gratings can be non-continuous. The grating 102-1 can be configured to guide and disperse the light with a wavelength of 400 to 500 nm. The grating 102-2 can be configured to guide and disperse the light with a wavelength of 520 to 600 nm. In some other embodiments, the wavelength bands of the N gratings can be non-sequential. For example, the grating 102-1 can be configured to guide and disperse the light with a wavelength of 400 to 500 nm. The grating 102-2 can be configured to guide and disperse the light with a wavelength of 520 to 600 nm. The grating 102-3 can be configured to guide and disperse the light with a wavelength of 500 to 520 nm.

By designing and applying the grating array 102, a larger light wavelength band range can be covered. A better light division effect can be realized. The grating array 102 can be a meta-grating array having a metasurface or a normal grating array without a metasurface, such as a slit grating array, a lenticular grating array, or a blazed grating array, or a diffraction optical path device array. Compared to a normal grating array and a diffraction optical path device array, the meta-grating array can be configured to increase dispersion, improve the efficiency of dispersed light without polarization selection, simplify the structure of the spectrometer, and reduce cost. In some other embodiments, the grating array can be combined with a dispersion device such as a prism to disperse the light, which is not limited here. Compared to dispersing the light through the grating array, a combination of the grating array and the dispersion device (e.g., a prism) can be used to further increase the dispersion.

In some embodiments, the grating array 102 can include the meta-grating array. Each grating of the gratings 102-1 to 102-N can include a metasurface extending along a second direction (direction Y in FIG. 2) perpendicular to a first direction (direction X in FIG. 2) in a corresponding plane (plane XY in FIG. 2). The metasurface can include a plurality of first nanostructures forming a one-dimensional grating or a two-dimensional grating.

Figure 3:
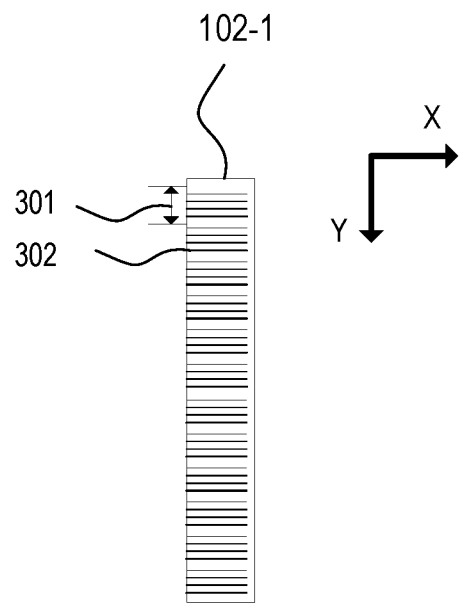
FIG. 3 is a schematic top view showing a grating of the grating array in the spectrometer of FIG. 1 according to some embodiments of the present disclosure.

FIG. 3 is a schematic top view showing the grating 102-1 of the grating array in the spectrometer 100 of FIG. 1 according to some embodiments of the present disclosure. The grating 102-1 includes a plurality of grating lines 302 and has a grating period 301. In some embodiments, in FIG. 3, the grating period 301 includes 4 grating lines 302. However, in some other embodiments, one grating period can include another number of grating lines 302.

In the meta-grating, the grating period 301 can include a certain number of first nanostructures. The nanostructures can be sub-wavelength structural units and configured to modulate the periodic phase change of the outgoing light. These first nanostructures can form a plurality of one-dimensional grating lines 302 to cause the meta-grating 102-1 to be a one-dimensional grating. In some other embodiments, the first nanostructures can also be distributed in two dimensions to cause the meta-grating 102-1 to be a two-dimensional grating.

According to some embodiments, in each grating array, the first nanostructures in different gratings can be different from each other in at least one of material, shape, period, arrangement manner, or height.

In FIG. 2, the plurality of first nanostructures included in the meta-grating 102-2 differ from the first plurality of nanostructures included in the meta-grating 102-1 in properties (e.g., material, shape, period, and/or height) and/or arrangement manner. For example, the meta-grating 102-1 can be designed to process light in the visible wavelength band. The first nano-structures of the meta-grating 102-1 can be made of a titanium dioxide material. The meta-grating 102-2 can be designed to process light in the near-infrared wavelength band. The first nano-structures of the meta-grating 102 can be made of a silicon material. In other examples, the plurality of first nanostructures included in the meta-grating 102-2 can differ from the plurality of first nanostructures included in the meta-grating 102-1 in spatial shape and/or height.

In some embodiments, the first plurality of nanostructures included in the meta-grating 102-1 can be arranged differently from the first plurality of nanostructures included in the meta-grating 102-2. In addition, the grating period of the meta-grating 102-1 can be different from the grating period of the meta-grating 102-2.

By designing different first nano-structures and the arrangement manners of the first nano-structures for light of different wavelength bands, portions of the light of different wavelength bands can be more accurately guided and dispersed.

Figure 4:
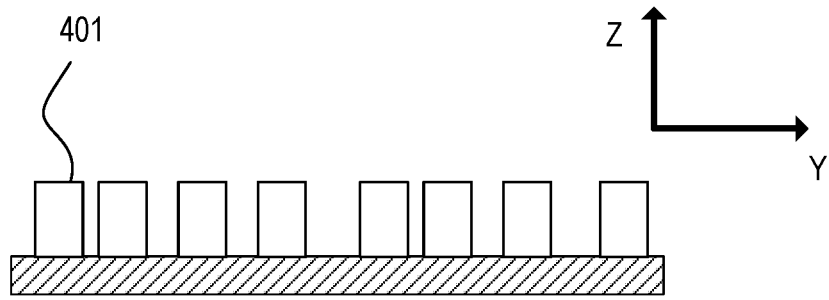
FIG. 4 is a schematic cross-section diagram of the grating in FIG. 3 in direction Y according to some embodiments of the present disclosure.
Figure 5:
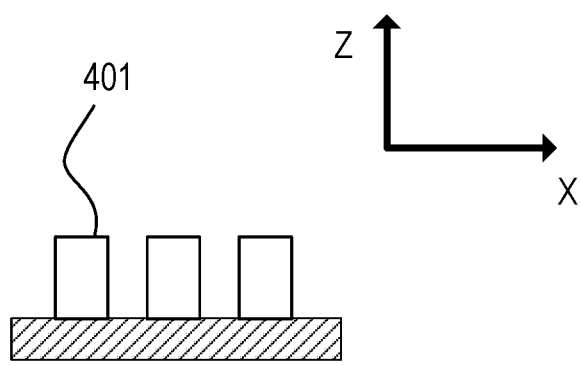
FIG. 5 is a schematic cross-section diagram of the grating in FIG. 3 in direction X according to some embodiments of the present disclosure.

FIG. 4 is a schematic cross-section diagram of the grating 102-1 in FIG. 3 in direction Y according to some embodiments of the present disclosure. FIG. 5 is a schematic cross-section diagram of the grating 102-1 in FIG. 3 in direction X according to some embodiments of the present disclosure. The grating 102-1 in FIG. 3 can be a one-dimensional grating or a two-dimensional grating. FIG. 4 and FIG. 5 show a plurality of nano-structures 401 that form a two-dimensional grating. The first nanostructure 401 can have any suitable three-dimensional shape, which is not limited here.

In some embodiments, each metasurface array of the at least one metasurface array can include N metasurfaces arranged at a corresponding plane. Each metasurface can be configured to selectively direct and focus light of corresponding different wavelength ranges.

Figure 6:
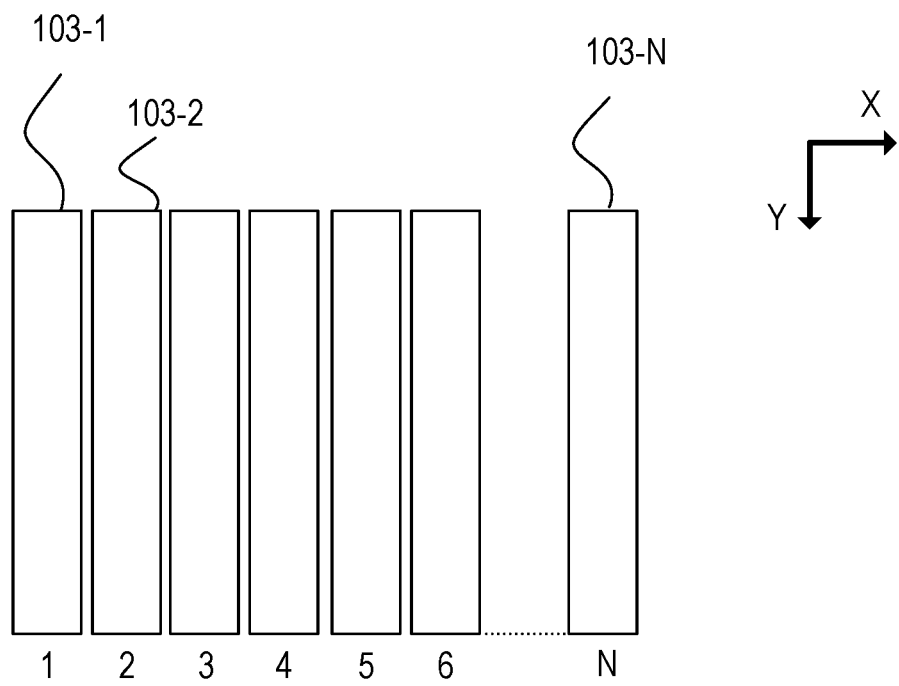
FIG. 6 is a schematic top view showing a metasurface array in the spectrometer in FIG. 1 according to some embodiments of the present disclosure.

FIG. 6 is a schematic top view showing the metasurface array 103 in the spectrometer 100 in FIG. 1 according to some embodiments of the present disclosure. In FIG. 6, the metasurfaces 103-1 to 103-N are arranged side by side along the direction of the X-axis.

Similar to the grating array 102, in some embodiments, wavelength bands targeted by the N metasurfaces in the metasurface array 103 can be continuous. For example, the metasurface 103-1 can be configured to guide and focus light with a wavelength of 400 to 500 nm. The metasurface 103-2 can be configured to guide and focus light with a wavelength of 500 to 600 nm. The metasurface 103-3 can be configured to guide and focus light with a wavelength of 600 to 700 nm. In some embodiments, the wavelength bands targeted by the N metasurfaces can be non-continuous or non-sequential. For example, the metasurface 103-1 can be configured to guide and focus light with a wavelength of 400 to 500 nm. The metasurface 103-2 can be configured to guide and focus light with a wavelength of 520 to 600 nm. In some embodiments, the wavelength bands targeted by the N metasurfaces can be non-sequential. For example, the metasurface 103-1 can be configured to guide and focus light of a wavelength of 400 to 500 nm. The metasurface 103-2 can be configured to guide and focus light of a wavelength of 520 to 600 nm. The metasurface 103-3 can be configured to guide and focus light of a wavelength of 500-520 nm.

By designing and applying the metasurface array 103 shown in FIG. 6, a larger wavelength band range of light can be covered.

In some embodiments, each metasurface of the N metasurfaces can include a plurality of second nanostructures. The plurality of second nanostructures can be arranged one-dimensionally or two-dimensionally to have a focus function. The second nanostructure can be the first nanostructure 401 as shown in FIG. 4 and FIG. 5. The second nanostructure can be configured to change features of polarization, amplitude, phase, and propagation mode of incident light to generate guide and focus effect for light.

In some embodiments, in each metasurface array, the second nanostructures of different metasurfaces can be different from each other in at least one of material, shape, period, arrangement manner, or height.

In FIG. 6, the plurality of second nanostructures included in the metasurface 103-2 differ from the plurality of second nanostructures included in the metasurface 103-1 in the properties (e.g., material, shape, period, and height) and the arrangement manner. For example, the metasurface 103-1 can be designed to process light in the visible wavelength band. The second nanostructures in the metasurface 103-1 can be made of a titanium dioxide material. The metasurface 103-2 can be designed to process light in the near-infrared wavelength band. The second nanostructures in the metasurface 103-2 can be made of a silicon material. In some other embodiments, the plurality of second nanostructures included in the metasurface 103-2 can differ from the plurality of second nanostructures included in the metasurface 103-1 in stereoscopic shape and height.

In some embodiments, the plurality of second nanostructures included in the metasurface 103-1 and the plurality of second nanostructures included in the metasurface 103-2 can have different arrangement manners.

By designing different second nanostructures and arrangement manners of the second nanostructures for light of different wavelength bands, portions of the light of different wavelength bands can be guided and focused more accurately.

In some embodiments, the at least one grating array can include two or more grating arrays. For any two grating arrays directly neighboring to each other on an optical path, N gratings in an upstream grating array on the optical path can be in a one-to-one correspondence with N gratings in a downstream grating array on the optical path. Light incident on a first grating of the upstream grating array on an optical path can be deflected by the first grating to a second grating of the downstream grating array on the optical path. The second grating can have a same relative position in the downstream grating array on the optical path as the first grating in the upstream grating array on the optical path.

In some embodiments, the N metasurfaces can have a same arrangement manner in the metasurface array 103 as the N gratings in each grating array 102. The N metasurfaces can have a one-to-one correspondence with the N gratings. Light incident on a meta-grating in the most downstream grating array on the optical path in the at least one grating array 102 can be deflected by the meta-grating to a metasurface of the most upstream metasurface array on the optical path in the at least one metasurface array 103, which is at the same relative position in the most upstream metasurface array on the optical path as the meta-grating in the most downstream grating array on the optical path.

Figure 7:
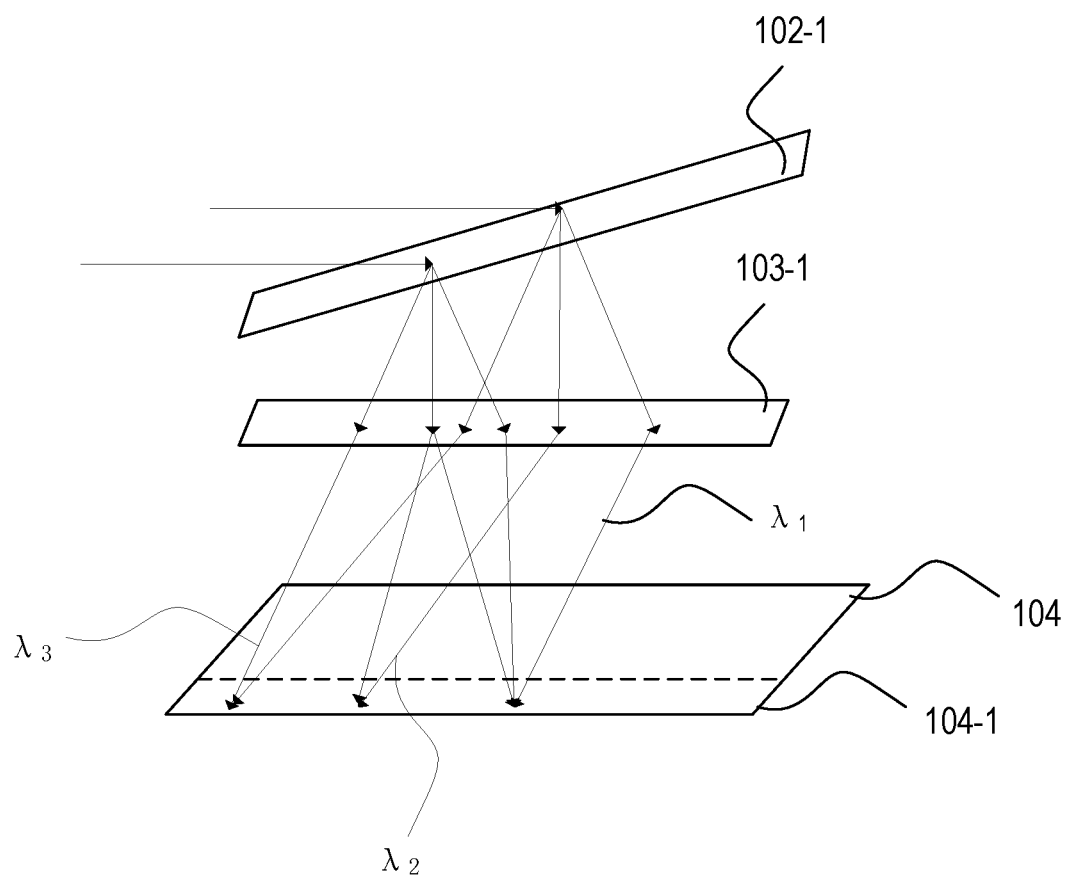
FIG. 7 is a schematic diagram showing a working principle of the spectrometer in FIG. 1 according to some embodiments of the present disclosure.

FIG. 7 is a schematic diagram showing a working principle of the spectrometer 100 in FIG. 1 according to some embodiments of the present disclosure. Assume that the grating 102-1 is designed to guide and disperse the light with a wavelength of 400 to 500 nm, and the metasurface 103-1 is designed to guide and focus the light with a wavelength of 400 to 500 nm.

After the light is incident to the grating 102-1, the grating 102-1 can divide the light with a wavelength of 400 to 500 nm. The light with a wavelength of 400 to 500 nm of the incident light can be guided and dispersed. The light with the wavelength of 400 to 500 nm after being guided and dispersed can be incident to the metasurface 103-1 configured to guide and focus the light with the wavelength of 400 to 500 nm. The grating 102-1 can be located in the grating array 102 at the same relative position as the metasurface 103-1 in the metasurface array 103. The metasurface 103-1 can guide and focus light with wavelengths at $\lambda1$, $\lambda2$, and $\lambda3$. Values of $\lambda1$, $\lambda2$, and $\lambda3$ can be between 400 to 500 nm.

FIG. 7 shows that the light is incident to the metasurface 103-1 of the metasurface array 103 after passing through the grating 102-1. In some embodiments, the spectrometer 100 can include the plurality of grating arrays 102 that are optically cascaded. Before passing through the grating 102-1 in FIG. 7, the light passes through one or more grating arrays. The grating 102-1 is located in a grating array of the plurality of grating arrays 102 at a most downstream on the optical path. Thus, the light passing through the grating array 102 at the most downstream on the optical path can be no longer a broad spectrum (polychromatic light) but a plurality of kinds of monochromatic light with wavelengths between 400 and 500 nm. Such an embodiment is described below in connection with FIG. 8 and FIG. 9.

In some embodiments, the N metasurfaces can have a one-to-one correspondence with N areas of the detection plane. The light incident to the metasurface of the metasurface array at the most downstream on the optical path can be focused at different positions of an area of the N areas by the metasurface based on the wavelength and/or polarization. The area can be located in the detection plane at the same relative position as the metasurface in the metasurface array at the most downstream on the optical path.

Refer again to FIG. 7 and the previous examples, the metasurface 103-1 directs and focuses the light based on the wavelength and/or polarization of the light. The light guided and focused by the metasurface 103-1 can be incident to the area 104-1 of the photodetector 104. The metasurface 103-1 is at the same relative position in the metasurface array 103 as the area 104-1 in the detection plane of the photodetector 104. The area 104-1 can be configured to receive and detect the light that is guided and focused by the surface 103-1 and output a spectrum.

Although FIG. 7 shows that the N meta-gratings have a one-to-one correspondence with the N metasurfaces and the N metasurfaces have a one-to-one correspondence with the N areas of the detection plane. In some other embodiments, the meta-grating targeting the light of the same wavelength band may not be at the same relative position in the grating array as the metasurface targeting the light of the same wavelength band in the metasurface array. For example, the light after the meta-grating 102-1 can be guided and dispersed. Then, the light can be received by the metasurface 103-2 (not shown in FIG. 7). The wavelength band of the light targeted by the meta-grating 102-1 and the metasurface 103-2 can be the same. Similarly, the metasurface targeting the light of the same wavelength band can be not at the same relative position in the metasurface array as the area targeting the detection of the light of the same wavelength band in the detection plane. For example, after passing through the metasurface 103-2, the light can be guided and focused. Then, the light can be received and detected by the area 104-3 (not shown in FIG. 7).

Thus, light with a wavelength in a certain range can be focused in a fixed area of the detection plane. The photodetector can be configured to detect the light with the wavelength in a certain range in the fixed area and output a corresponding spectrum.

FIG. 7 shows only one metasurface 103-1 of the metasurface array 103. In some embodiments, the spectrometer 100 can include the plurality of metasurface arrays 103 that are optically cascaded. After passing through the metasurface 103-1 shown in FIG. 7, the light can pass through the plurality of metasurface arrays 103 at downstream of the optical path. The metasurface 103-1 can be located in the metasurface array of the plurality of metasurface arrays 103 at upstream on the optical path. Then, the light can be incident to the area 104-1 in the photodetector 104.

In some embodiments, the at least one of the metasurface arrays can include two or more metasurface arrays. For any metasurface arrays directly neighboring to each other on the optical path, the N metasurfaces of the upstream metasurface array on the optical path can have a one-to-one correspondence with the n surfaces of the downstream metasurface array on the optical path. The light incident to the first metasurface of the upstream metasurface array on the optical path can be deflected by the first metasurface to the second metasurface of the downstream metasurface array on the optical path. The second metasurface can be at the same relative position in the downstream metasurface array as the first metasurface in the upstream metasurface array. As shown in FIG. 1 and FIG. 7, the plurality of metasurface arrays that are optically cascaded are arranged between the metasurface array 103 and the photodetector 104. The metasurface arrays can have a similar structure to the metasurface array 103. Each metasurface array of the plurality of metasurface arrays can include metasurfaces configured to guide and focus the light of the plurality of wavelength bands. For example, each metasurface array of the plurality of metasurface arrays can include the metasurfaces configured to guide and focus the light with the wavelength of 400 to 500 nm, which correspond to the metasurface 103-1. After being guided and focused by the metasurface 103-1 on the optical path, the light with the wavelength of 400 to 500 nm can be incident to the neighboring metasurface configured to guide and focus the light with a wavelength of 400 to 500 nm at the downstream of the optical path. The metasurface at downstream of the optical path can guide and focus the light with a wavelength of 400 to 500 nm again. Then, the light can be incident to a metasurface located at a further downstream position on the optical path until the light is guided and focused in the area 104-1 of the photodetector 104.

In some embodiments, the at least one photodetector can include two or more photodetectors. The two or more photodetectors can be designed to detect light of different wavelength bands. The two or more photodetectors can be combined together at the detection plane. For example, for to-be-detected light with a wavelength band of 400 to 1500 nm, the two photodetectors can be combined. A first photodetector can have high sensitivity to light with a wavelength of 400 to 1000 nm, and a second photodetector can have high sensitivity to light with a wavelength of 1000 to 1500 nm.

By combining the plurality of photodetectors, a detection range of the spectrometer can cover the whole wavelength band of the to-be-detected light, and a spectrum with higher precision can be output.

Figure 8:
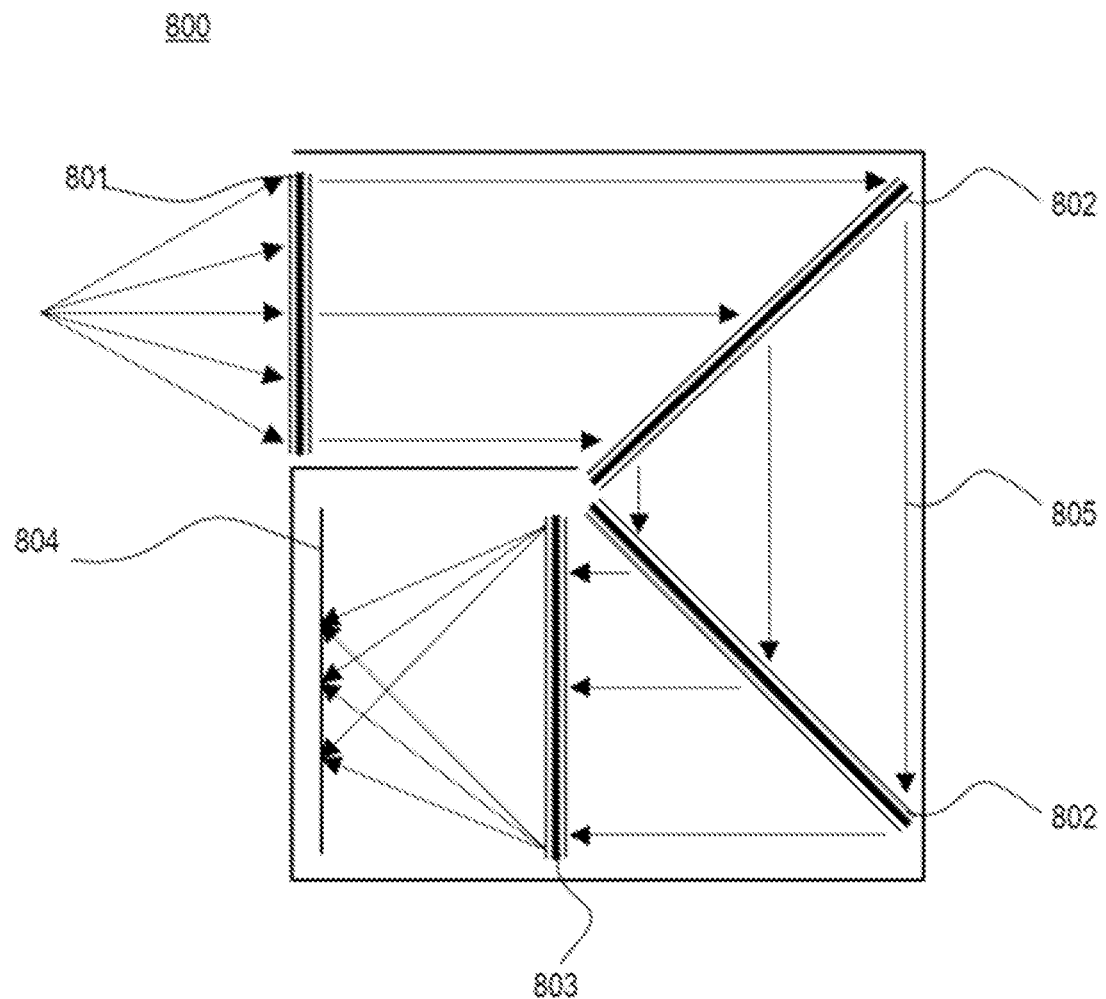
FIG. 8 is a schematic cross-section diagram of another spectrometer according to some other embodiments of the present disclosure.

FIG. 8 is a schematic cross-section diagram of another spectrometer 800 according to some other embodiments of the present disclosure. The spectrometer 800 includes two grating arrays 802 that are optically cascaded. Light emitted from a slit can pass through the collimator 801. After passing through the collimator 801, directions of different kinds of light with different wavelengths can be parallel. The light passing through the collimator 801 can pass through a first grating array and a second grating array. As shown in FIG. 8, light with a center wavelength 805 can be guided and dispersed by the first grating array and the second grating array. A propagation direction of the light can be deflected twice with a total deflection angle of 180°. Then, the light from the second grating array can be guided and focused by a metasurface array 803. Then, the light can be detected by the photodetector 804, and a spectrum can be output. As shown in FIG. 8, after passing through the two grating arrays, a dispersion degree of the light can be further improved compared to the situation in FIG. 1.

The two grating arrays 802 can include gratings targeting the same wavelength band. By taking the wavelength band of 400 to 500 nm as an example, after passing through the grating configured to guide and disperse the light with the wavelength band of 400 to 500 nm in the first grating array 802, the light of the wavelength band can be received by the grating configured to guide and disperse the light with the wavelength band of 400 to 500 nm in the second grating array 802. The grating targeting the light with the wavelength band of 400 to 500 nm in the first grating array 802 can be at the same relative position as the grating targeting the light with the wavelength band of 400 to 500 nm in the second grating array 802.

Figure 9:
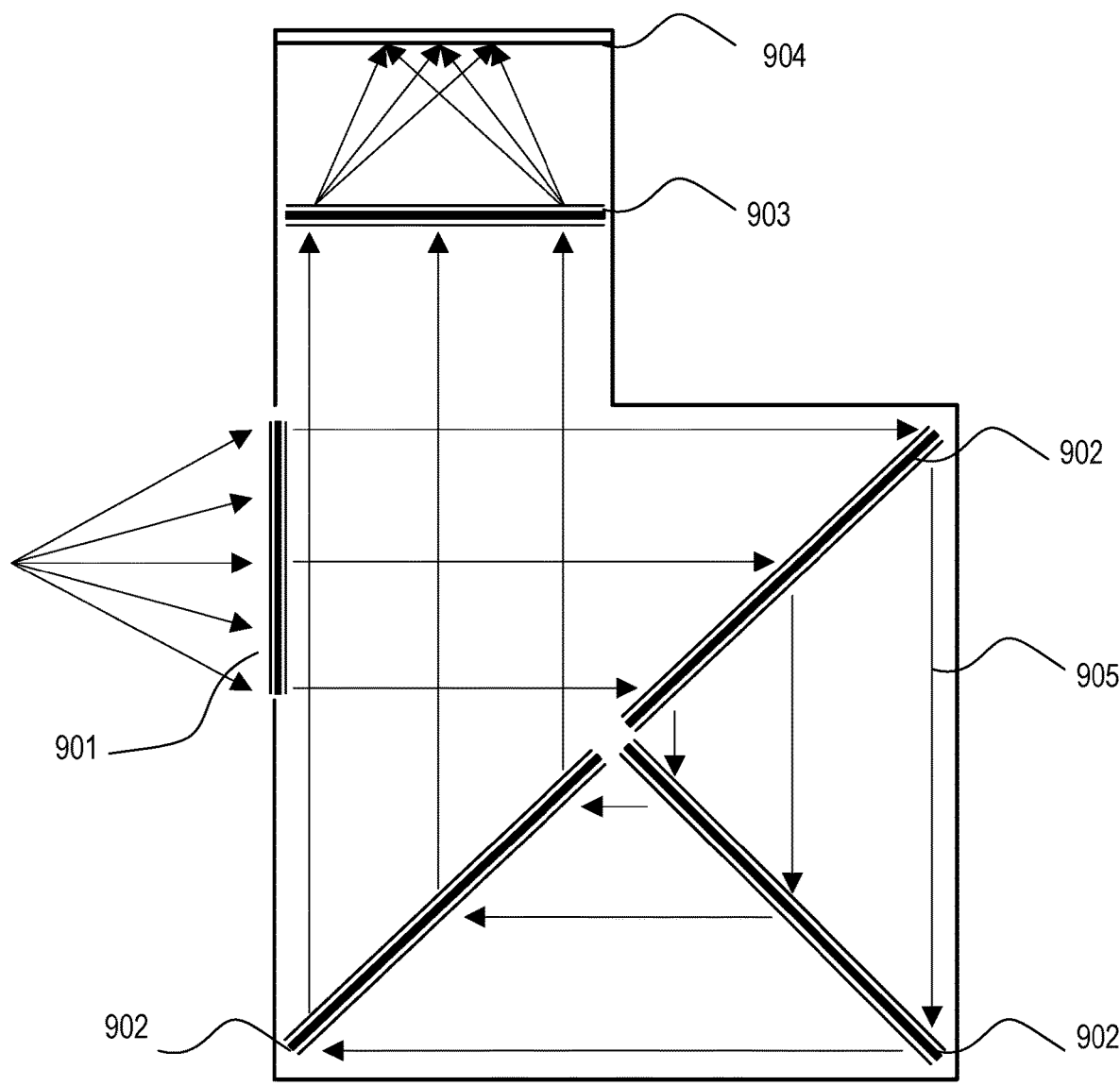
FIG. 9 is a schematic cross-section diagram of another spectrometer according to some other embodiments of the present disclosure.

FIG. 9 is a schematic cross-section diagram of another spectrometer 900 according to some other embodiments of the present disclosure. The spectrometer 900 includes three meta-grating arrays 902. Similarly, in FIG. 8, light emitted from a slit passes through a collimator 901. Propagation directions of portions of the light with different wavelength bands are parallel to each other after passing through the collimator 901. As shown in FIG. 9, after passing through the three grating arrays 902, light with a center wavelength 905 is deflected three times. Then, the light is guided and focused by a metasurface array 903. Then, the light can be detected by the photodetector 904, and the spectrum can be output. The three grating arrays 902 can be arranged in a T shape with included angles of 90°. Thus, the incident light can be dispersed three times and deflected by 270°.

In some embodiments, the spectrometer can further include a substrate. The substrate can be located on an optical path from the collimator to the detection plane. The at least one grating array and the at least one metasurface array can be integrated at the substrate.

Figure 10:
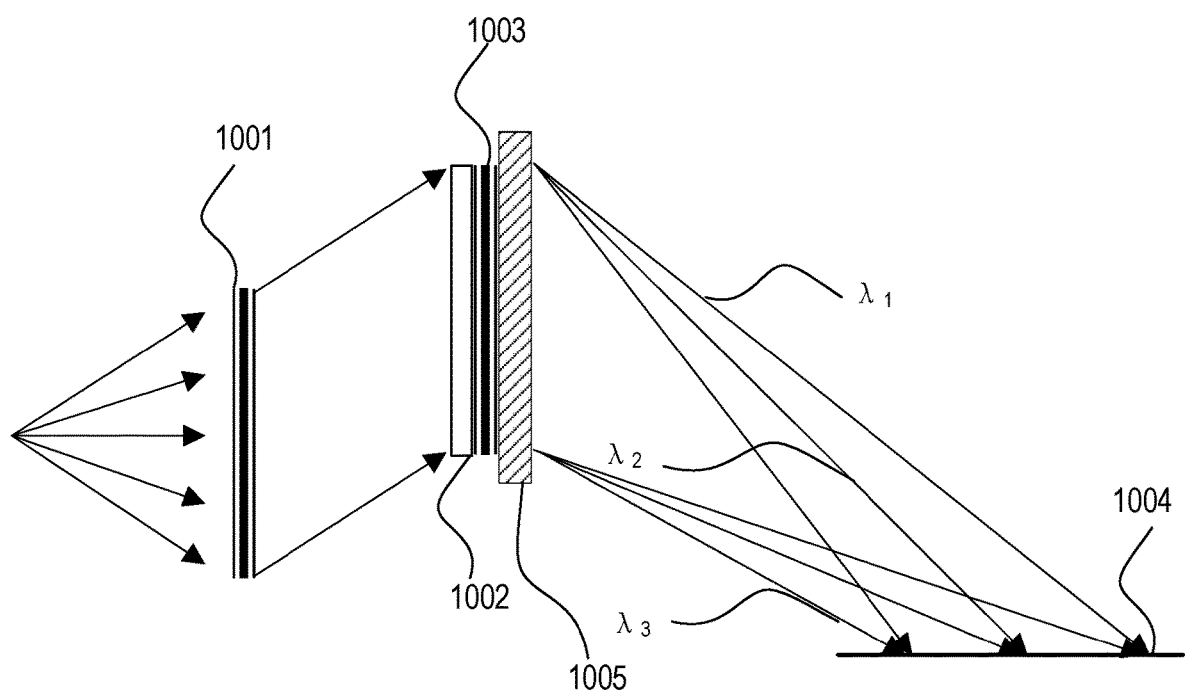
FIG. 10 is a schematic cross-section diagram of another spectrometer according to some other embodiments of the present disclosure.

FIG. 10 is a schematic cross-section diagram of another spectrometer 1000 according to some other embodiments of the present disclosure. In the spectrometer 1000, a grating array 1002, a metasurface array 1003, and a substrate 1005 are stacked in sequence. The light passing through the collimator 1001 can sequentially pass through the grating array 1002, and the metasurface array 1003. Then, the light is incident to the photodetector 1004. Then, the photodetector 1004 can detect the light and output a spectrum.

Figure 11:
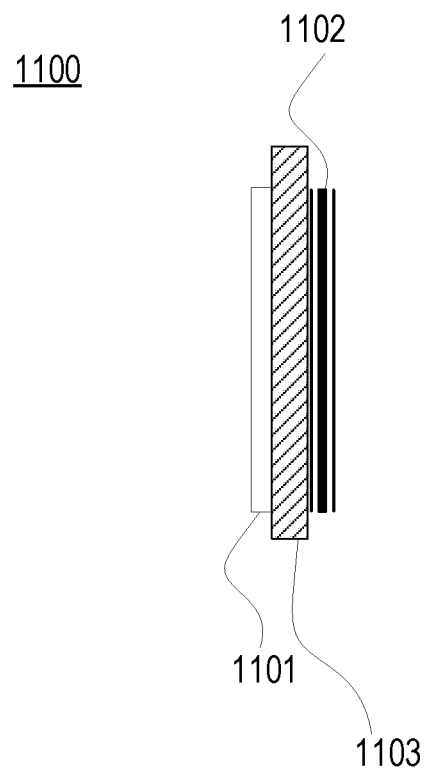
FIG. 11 is a schematic diagram showing a replacement structure formed by a grating array, a metasurface array, and a substrate in the spectrometer in FIG. 10 according to some other embodiments of the present disclosure.

FIG. 11 is a schematic diagram showing a replacement structure 1100 formed by a grating array, a metasurface array, and a substrate in the spectrometer 1000 in FIG. 10 according to some other embodiments of the present disclosure. As shown in FIG. 11, a grating array 1101, a substrate 1103, and a metasurface array 1102 are stacked in sequence. The light can first pass through the grating array 1101, then the substrate 1103, and then the metasurface array 1102.

Figure 12:
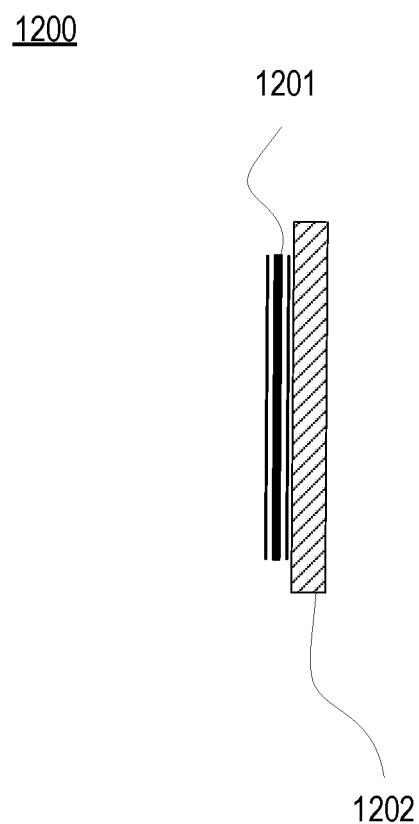
FIG. 12 is a schematic diagram showing another replacement structure formed by a grating array, a metasurface array, and a substrate in the spectrometer in FIG. 10 according to some other embodiments of the present disclosure.

FIG. 12 is a schematic diagram showing another replacement structure 1200 formed by a grating array, a metasurface array, and a substrate in the spectrometer 1000 in FIG. 10 according to some other embodiments of the present disclosure. In some embodiments, the grating array and the metasurface lens array are integrated in a same semiconductor process layer 1201. After passing through the semiconductor process layer 1201, the light can pass through the substrate 1202.

In some embodiments, the at least one grating array and the at least one metasurface array can be attached or integrally formed with each other. In some embodiments, the grating array and the metasurface lens array are formed by attaching or are integrally formed, and hence the substrate shown in FIG. 10 to FIG. 12 is not needed.

Figure 13:
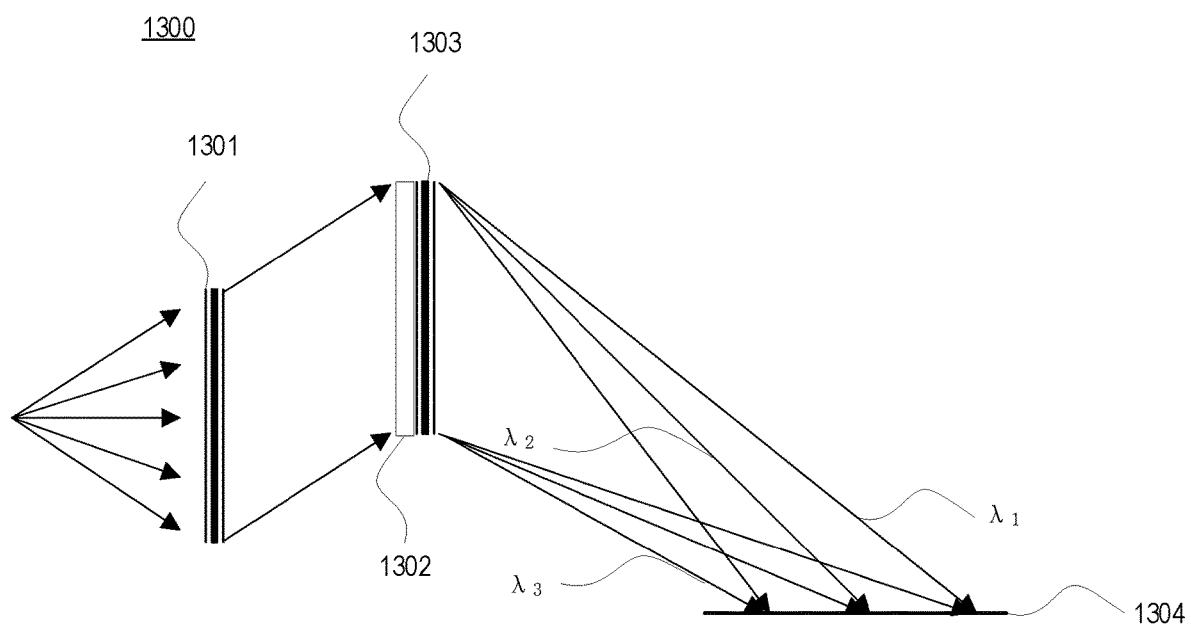
FIG. 13 is a schematic cross-section diagram of another spectrometer according to some other embodiments of the present disclosure.

FIG. 13 is a schematic cross-section diagram of another spectrometer 1300 according to some other embodiments of the present disclosure. In some embodiments, after passing through a collimator 1301, the light passes through a grating array 1302 and a metasurface array 1303 in sequence and is detected by the photodetector 1304. A spectrum can be then output. By removing the substrate, energy loss of the light can be reduced during propagation.

In above embodiments, the grating array and the metasurface array can transmit light. In some other embodiments, the grating array and the metasurface array can reflect light. A dispersion ratio of the light can be increased with transmission compared to reflection. Thus, the spectrometer can output a more accurate spectrum.

In some embodiments, the guidance of the at least one grating array and the at least one metasurface array for light can include one of transmission, reflection, and a mixture of transmission and reflection.

Figure 14:
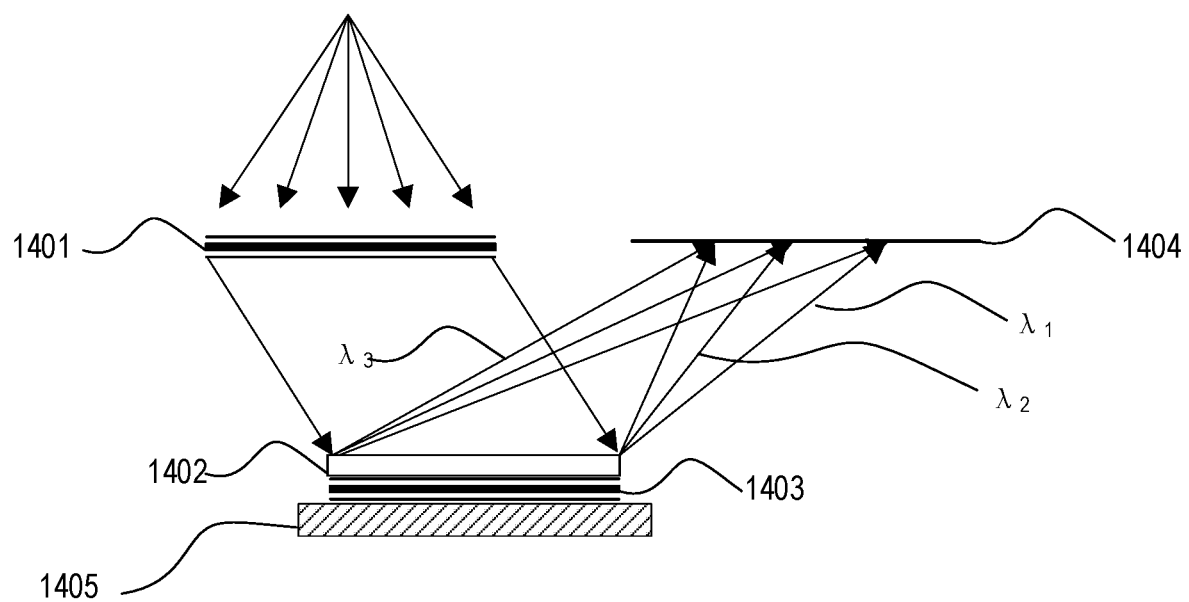
FIG. 14 is a schematic cross-section diagram of another spectrometer according to some other embodiments of the present disclosure.

FIG. 14 is a schematic cross-section diagram of another spectrometer 1400 according to some other embodiments of the present disclosure. A reflective coating is applied between a substrate 1405 and a metasurface array 1403 to reflect light. After passing through a collimator 1401, the light passes through a grating array 1402 and a metasurface array 1403 in sequence and is then reflected by the reflective coating to a photodetector 1404. The light can be then detected by photodetector 1404, and a spectrum can be output.

The grating array 1402 and the metasurface array 1403 can also be integrated into a same semiconductor process layer. The semiconductor process layer can be the semiconductor process layer 1201 as shown in FIG. 12.

Figure 15:
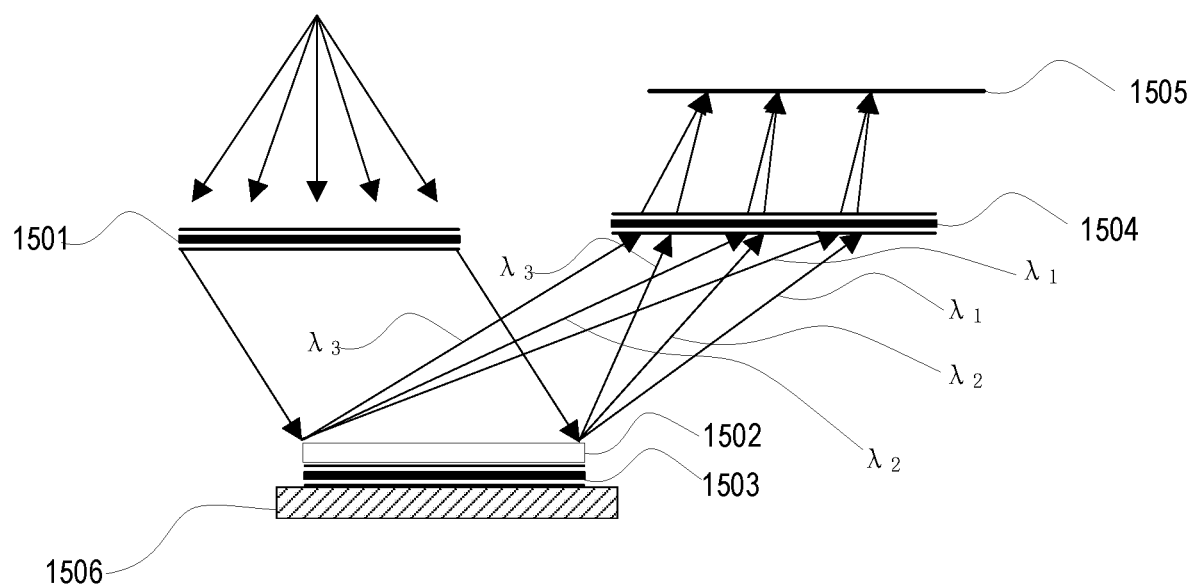
FIG. 15 is a schematic cross-section diagram of another spectrometer according to some other embodiments of the present disclosure.

FIG. 15 is a schematic cross-section diagram of another spectrometer 1500 according to some other embodiments of the present disclosure. A reflective coating can be applied between a substrate 1506 and a metasurface array 1503 to reflect light. After passing through a collimator 1501, the light passes through a grating array 1502 and a first metasurface array 1503 in sequence and is reflected by the reflective coating to a second metasurface array 1504. After being transmitted and focused by the second metasurface array 1504, the light is incident to a photodetector 1505 and detected then by the photodetector 1505. A spectrum can be output.

The grating array 1502 and the metasurface array 1503 can also be integrated into one semiconductor process layer. The semiconductor process layer can be the semiconductor process layer 1201 as shown in FIG. 12.

In some embodiments, the spectrometer can further include a filter. The filter can be configured to filter out light having a wavelength outside the detection range of the spectrometer from light emitted from the slit. In one example, the filter can be used as a separate device and can be arranged on the optical path from the slit to the metasurface array. The filter can be configured to filter out the light with a wavelength outside the detection range of the spectrometer. In some embodiments, the filter can be integrated into the collimator, the grating array, or the metasurface array.

Embodiments of the present disclosure also provide an electronic device, including the spectrometer. The electronic device can include but is not limited to a desktop computer, a server computer, a notebook or netbook computer, a mobile apparatus (e.g., a tablet, a cellular or another wireless telephone (e.g., a smartphone), a notepad computer, and a mobile station), a wearable apparatus (e.g., glasses, a watch), an entertainment apparatus (e.g., an entertainment device, a top box communicatively coupled to a display apparatus, and a gaming console), a television or other display apparatus, and an automotive computer.

The disclosure has been illustrated and described in detail with the accompanying drawings and above description. However, the description and the explanation should be considered illustrative and exemplary but not limiting. The present disclosure is not limited to embodiments of the present disclosure. By studying the accompanying drawings, the disclosed contents, and the appended claims, those skilled in the art can understand and implement the variations to embodiments of the present disclosure when practicing the protected topic. In the claims, the term "comprising" does not exclude elements or steps that are not listed. An indefinite article "a" or "an" does not exclude a plurality of, and the term "a plurality of" means two or more. The mere fact that certain elements are recited in different dependent claims that do not depend from each other does not indicate that the elements cannot be combined.

What is claimed is:

1. A spectrometer comprising:
   a collimator configured to collimate light including a plurality of portions with different wavelengths;
   a grating array configured to guide, disperse, and deflect the light from the collimator, and including a plurality of gratings arranged along a plane and each configured to selectively guide and disperse light of a corresponding wavelength range;
   a metasurface array configured to guide and focus the light from the grating array, the plurality of portions of the light with different wavelengths being focused by the metasurface array to different positions on a detection plane; and
   a photodetector configured to receive the light from the metasurface array at the detection plane;
   wherein:
      the light is emitted from a slit; and
      the plurality of gratings are arranged side by side along a direction parallel to a direction along which the slit extends.

2. The spectrometer of claim 1, wherein:
   the direction along which the plurality of gratings are arranged is a first direction; and
   each of the plurality of gratings includes a metasurface extending along a second direction perpendicular to the first direction in the plane, the metasurface including a plurality of nanostructures forming a one-dimensional grating or a two-dimensional grating.

3. The spectrometer of claim 2, wherein the nanostructures of different ones of the plurality of gratings are different from each other in at least one of a material, a shape, a period, an arrangement manner, or a height of the nanostructures.

4. The spectrometer of claim 1, wherein:
   the grating array is a first grating array and the spectrometer further includes a second grating array arranged downstream the first grating array on an optical path and including a plurality of gratings;
   the plurality of gratings of the first grating array have a one-to-one correspondence with the plurality of gratings of the second grating array;
   a first grating in the first grating array is configured to deflect a portion of the light to a second grating in the second grating array; and
   the second grating is located at a same relative position in the second grating array as the first grating in the first grating array.

5. The spectrometer of claim 1, wherein:
   the plane is a first plane; and
   the metasurface array includes a plurality of metasurfaces arranged along a second plane and each configured to selectively guide and focus light of a corresponding wavelength range.

6. The wavelength range of claim 5, wherein:
   the plurality of metasurfaces have a same arrangement manner in the metasurface array as the plurality of gratings in the grating array;
   the plurality of metasurfaces have a one-to-one correspondence with the plurality of gratings;
   one grating of the plurality of gratings is configured to deflect a portion of the light to one metasurface of the plurality of metasurfaces; and
   the one metasurface is located at a same relative position in the metasurface array as the one grating in the grating array.

7. The spectrometer of claim 5, wherein:
   the metasurface array is a first metasurface array and the spectrometer further includes a second metasurface array arranged downstream the first metasurface array on an optical path and including a plurality of metasurfaces;
   the plurality of metasurfaces of the first metasurface array have a one-to-one correspondence with the plurality of metasurfaces of the second metasurface array;
   a first metasurface in the first metasurface array is configured to deflect a portion of the light to a second metasurface in the second metasurface array; and
   the second metasurface is located at a same relative position in the second metasurface array as the first metasurface in the first metasurface array.

8. The spectrometer of claim 5, wherein each of the plurality of metasurfaces includes a plurality of nanostructures arranged one-dimensionally or two-dimensionally to have a focus function.

9. The spectrometer of claim 8, wherein in the nanostructures of different ones of the plurality of metasurfaces are different from each other in at least one of a material, a shape, a period, an arrangement manner, or a height of the nanostructures.

10. The spectrometer of claim 5, wherein:
    the plurality of metasurfaces have a one-to-one correspondence with a plurality of areas of the detection plane;
    one metasurface of the plurality of metasurfaces is configured to focus the light to one area of the plurality of areas based on at least one of wavelength or polarization; and
    the one area is located at a same relative position in the detection plane as the one metasurface in the metasurface array.

11. The spectrometer of claim 1, wherein the photodetector is one of a plurality of photodetectors of the spectrometer that are configured to detect light of different wavelengths and are combined at the detection plane.

12. The spectrometer of claim 1, wherein each of the grating array and the metasurface array is configured to transmit the light, reflect the light, or transmit and reflect the light.

13. The spectrometer of claim 1, wherein the grating array and the metasurface array are attached together or integrally formed.

14. The spectrometer of claim 1, further comprising:
a substrate arranged on an optical path from the collimator to the detection plane;
wherein the grating array and the metasurface array are integrated at the substrate.

15. The spectrometer of claim 1, further comprising:
a filter configured to filter out light with a wavelength outside a detection range of the spectrometer.

16. An electronic device comprising:
a spectrometer including:
- a collimator configured to collimate light including a plurality of portions with different wavelengths;
- a grating array configured to guide, disperse, and deflect the light from the collimator, and including a plurality of gratings arranged along a plane and each configured to selectively guide and disperse light of a corresponding wavelength range;
- a metasurface array configured to guide and focus the light from the grating array, the plurality of portions of the light with different wavelengths being focused by the metasurface array to different positions on a detection plane; and
- a photodetector configured to receive the light from the metasurface array at the detection plane;

wherein:
  the light is emitted from a slit; and
  the plurality of gratings are arranged side by side along a direction parallel to a direction along which the slit extends.

* * * * *